(12) United States Patent
Hampson et al.

(10) Patent No.: US 9,890,689 B2
(45) Date of Patent: Feb. 13, 2018

(54) GASEOUS FUEL COMBUSTION

(71) Applicant: Woodward, Inc., Fort Collins, CO (US)

(72) Inventors: Gregory James Hampson, Boulder, CO (US); Domenico Chiera, Fort Collins, CO (US)

(73) Assignee: Woodward, Inc., Fort Collins, CO (US)

( * ) Notice: Subject to any disclaimer, the term of this patent is extended or adjusted under 35 U.S.C. 154(b) by 0 days.

(21) Appl. No.: 14/927,327

(22) Filed: Oct. 29, 2015

(65) Prior Publication Data

US 2017/0122184 A1   May 4, 2017

(51) Int. Cl.
*F02B 19/00* (2006.01)
*F02B 19/10* (2006.01)
(Continued)

(52) U.S. Cl.
CPC ...... *F02B 19/1085* (2013.01); *F02B 19/1023* (2013.01); *F02B 19/12* (2013.01);
(Continued)

(58) Field of Classification Search
CPC .. F02B 19/1023; F02B 19/12; F02B 19/1004; F02B 19/00; F02B 19/10; F02B 19/1019;
(Continued)

(56) References Cited

U.S. PATENT DOCUMENTS

| 892,296 A | 6/1908 | Oberhansli |
|---|---|---|
| 1,009,867 A | 11/1911 | Terry |

(Continued)

FOREIGN PATENT DOCUMENTS

| AT | 410007 | 1/2003 |
|---|---|---|
| AT | 509876 | 12/2011 |

(Continued)

OTHER PUBLICATIONS

Fino Scholl et al., "Development and Analysis of a Controlled Hot Surface Ignition System for Lean Burn Gas Engines" Proceedings of the ASME 2012 Internal Combustion Engine Division Spring Technical Conference ICES2012, May 6-9, 2012 (12 pages).

(Continued)

*Primary Examiner* — Thomas Moulis
*Assistant Examiner* — John Bailey
(74) *Attorney, Agent, or Firm* — Fish & Richardson P.C.

(57) ABSTRACT

In an internal combustion engine, gaseous fuel is injected in a first injection through a pre-combustion chamber into the combustion chamber to mix with air in the combustion chamber. The pre-combustion chamber has a jet aperture in fluid communication between the pre-combustion chamber and the combustion chamber. Mixed gaseous fuel and air is then ingested into the pre-combustion chamber from the combustion chamber and ignited. In a second injection, injecting gaseous fuel into the pre-combustion chamber and expelling, with the second injection, ignited gaseous fuel and air from the pre-combustion chamber through the jet aperture and into the combustion chamber as a flaming jet with a core of gaseous fuel.

19 Claims, 5 Drawing Sheets

(51) Int. Cl.
- *F02B 19/12* (2006.01)
- *F02D 41/30* (2006.01)
- *F02D 37/02* (2006.01)
- *F02M 21/02* (2006.01)

(52) U.S. Cl.
CPC ......... *F02D 37/02* (2013.01); *F02D 41/3005* (2013.01); *F02M 21/0215* (2013.01)

(58) Field of Classification Search
CPC .............. F02B 19/1028; F02B 19/1033; F02B 19/1038; F02B 19/1042; F02B 19/1047; F02B 19/1052; F02B 19/1057; F02B 19/1061; F02B 19/1066; F02B 19/1071; F02B 19/1076; F02B 19/108; F02B 19/1085; F02B 19/1095; F02D 37/02; F02D 41/3005; F02D 37/00; F02D 41/182; F02D 41/24; F02D 41/30; F02M 21/0215; F02M 21/0212; F02M 21/0209; F02M 21/0206; F02M 21/0203; F02M 21/02; F02M 21/00; F02M 57/06; F02P 9/00; F02P 9/007; F02P 13/00; F02P 21/00

USPC ....... 123/253, 261, 262, 263, 268, 269, 274, 123/275, 254, 255, 256, 258, 259, 260, 123/264, 265, 266, 267, 270, 271, 272, 123/273, 276, 277, 278, 279, 280, 281, 123/282, 283, 284, 285, 286, 287, 288, 123/289, 290, 291, 292, 293, 432, 433, 123/698, 445, 515, 525, 526, 527, 575, 123/143 R, 144; 701/104

See application file for complete search history.

(56) References Cited

U.S. PATENT DOCUMENTS

| | | |
|---|---|---|
| 1,242,375 A | 10/1917 | Robinson |
| 1,253,570 A | 1/1918 | Berry |
| 1,320,115 A | 10/1919 | Bloomhuff et al. |
| 1,322,493 A | 11/1919 | Little |
| 1,325,439 A | 12/1919 | Dinger |
| 1,360,294 A | 11/1920 | Hill |
| 1,361,347 A | 12/1920 | Nighswander |
| 1,361,580 A | 12/1920 | Herz |
| 1,538,750 A | 5/1925 | Scognamillo |
| 1,596,240 A | 8/1926 | Dikeman |
| 1,611,856 A | 12/1926 | Farnsworth |
| 1,700,603 A | 1/1929 | Vreeland et al. |
| 1,732,827 A | 10/1929 | Adam |
| 1,748,338 A | 2/1930 | Georgias |
| 1,963,801 A | 6/1934 | O'Marra |
| 2,047,575 A | 7/1936 | Burtnett |
| 2,127,513 A | 8/1938 | Harper, Jr. |
| 2,153,598 A | 4/1939 | Steward |
| 2,208,030 A | 7/1940 | Holmes |
| 2,231,173 A | 2/1941 | Starr |
| 2,299,924 A | 10/1942 | Ost |
| 2,314,128 A | 3/1943 | Coldwell |
| 2,416,107 A | 2/1947 | Litton |
| 2,456,080 A | 12/1948 | Wu Pe |
| 2,487,535 A | 11/1949 | Fernandez |
| 2,497,862 A | 2/1950 | Chuy |
| 2,509,538 A | 5/1950 | Sues |
| 2,586,864 A | 2/1952 | Rose |
| 2,614,546 A | 10/1952 | Schwarz |
| 2,673,554 A * | 3/1954 | Thaheld ............ F02B 21/00 123/26 |
| 2,758,576 A * | 8/1956 | Schlamann ......... F02B 19/1014 123/257 |
| 2,776,394 A | 1/1957 | Cuny et al. |
| 2,843,780 A | 7/1958 | Harper, Jr. |
| 2,895,069 A | 7/1959 | Davis |
| 2,899,585 A | 8/1959 | Dollenberg |
| 2,957,099 A | 10/1960 | Dutterer |
| 3,230,939 A | 1/1966 | Abramovich |
| 3,270,722 A * | 9/1966 | Bernard ............... F02B 19/12 123/255 |
| 3,300,672 A | 1/1967 | Fisher |
| 3,665,902 A | 5/1972 | Bloomfield |
| 3,710,764 A | 1/1973 | Jozlin |
| 3,718,425 A | 2/1973 | Weyl et al. |
| 3,911,874 A | 10/1975 | Vincent |
| 3,911,878 A | 10/1975 | Hofbauer et al. |
| 3,958,144 A | 5/1976 | Franks |
| 4,004,413 A * | 1/1977 | Ueno .................. F02B 19/10 123/1 A |
| 4,091,772 A * | 5/1978 | Heater ............... F02B 19/1009 123/255 |
| 4,092,558 A | 5/1978 | Yamada |
| 4,096,832 A * | 6/1978 | Casull ................ F02B 19/1004 123/143 B |
| 4,098,232 A | 7/1978 | Gleiter |
| 4,123,998 A | 11/1978 | Heintzeloman |
| 4,124,000 A * | 11/1978 | Genslak ................. F02B 3/00 123/256 |
| 4,125,094 A | 11/1978 | Noguchi et al. |
| 4,143,627 A | 3/1979 | Noguchi |
| 4,170,968 A | 10/1979 | Noguchi |
| 4,218,993 A | 8/1980 | Blackburn |
| 4,232,638 A * | 11/1980 | Takahashi .......... F02B 19/1085 123/260 |
| 4,242,990 A | 1/1981 | Scherenberg |
| 4,248,189 A | 2/1981 | Barber et al. |
| 4,248,192 A | 2/1981 | Lampard |
| 4,372,264 A | 2/1983 | Trucco |
| 4,398,513 A * | 8/1983 | Tanasawa ................ F02B 1/06 123/255 |
| 4,406,260 A | 9/1983 | Burley |
| 4,416,228 A | 11/1983 | Benedikt et al. |
| 4,424,780 A | 1/1984 | Trucco |
| 4,429,669 A | 2/1984 | Burley |
| 4,441,469 A * | 4/1984 | Wilke ..................... F02B 19/12 123/261 |
| 4,452,189 A | 6/1984 | Latsch et al. |
| 4,490,122 A | 12/1984 | Tromeur |
| 4,509,476 A | 4/1985 | Breuser et al. |
| 4,532,899 A | 8/1985 | Lorts |
| 4,612,888 A * | 9/1986 | Ishida .................. F02B 19/08 123/261 |
| 4,641,616 A | 2/1987 | Lampard |
| 4,646,695 A | 3/1987 | Blackburn |
| 4,744,341 A | 5/1988 | Hareyama et al. |
| 4,765,293 A * | 8/1988 | Gonzalez ........... F02B 19/1004 123/259 |
| 4,795,937 A | 1/1989 | Wagner et al. |
| 4,854,281 A | 8/1989 | Hareyama et al. |
| 4,901,688 A | 2/1990 | Kashiwara et al. |
| 4,930,473 A | 6/1990 | Dietrich |
| 4,963,784 A | 10/1990 | Niessner |
| 4,987,868 A | 1/1991 | Richardson |
| 5,014,656 A | 5/1991 | Leptich et al. |
| 5,051,651 A | 9/1991 | Kashiwara et al. |
| 5,067,458 A | 11/1991 | Bailey |
| 5,076,229 A * | 12/1991 | Stanley ................. F02B 19/04 123/256 |
| 5,085,189 A * | 2/1992 | Huang ................ F02B 19/1004 123/257 |
| 5,091,672 A | 2/1992 | Below |
| 5,105,780 A | 4/1992 | Richardson |
| 5,107,168 A | 4/1992 | Friedrich et al. |
| 5,222,993 A | 6/1993 | Crane |
| 5,224,450 A | 7/1993 | Paul et al. |
| 5,239,959 A | 8/1993 | Loth et al. |
| 5,245,963 A | 9/1993 | Sabol et al. |
| 5,271,365 A * | 12/1993 | Oppenheim ........ F02B 19/1004 123/256 |
| 5,369,328 A | 11/1994 | Gruber et al. |
| 5,408,961 A | 4/1995 | Smith |
| 5,421,300 A | 6/1995 | Durling et al. |
| 5,430,346 A | 7/1995 | Johnson |

(56) References Cited

U.S. PATENT DOCUMENTS

| | | | |
|---|---|---|---|
| 5,454,356 A | 10/1995 | Kawamura | |
| 5,554,908 A | 9/1996 | Kuhnert et al. | |
| 5,555,862 A | 9/1996 | Tozzi | |
| 5,555,867 A | 9/1996 | Freen | |
| 5,555,868 A * | 9/1996 | Neumann | F02B 19/1023 123/275 |
| 5,560,326 A * | 10/1996 | Merritt | F02B 19/02 123/259 |
| 5,612,586 A | 3/1997 | Benedikt et al. | |
| 5,619,959 A | 4/1997 | Tozzi | |
| 5,623,179 A | 4/1997 | Buhl | |
| 5,632,253 A | 5/1997 | Paul et al. | |
| 5,647,444 A | 7/1997 | Williams | |
| 5,662,181 A | 9/1997 | Williams et al. | |
| 5,678,517 A * | 10/1997 | Chen | F02B 19/1009 123/263 |
| 5,715,788 A * | 2/1998 | Tarr | F02M 57/06 123/297 |
| 5,791,374 A | 8/1998 | Black et al. | |
| 5,799,637 A | 9/1998 | Cifuni | |
| 5,803,026 A * | 9/1998 | Merritt | F02B 19/06 123/48 D |
| 5,821,675 A | 10/1998 | Suzuki | |
| 5,829,407 A * | 11/1998 | Watson | F02B 19/1014 123/275 |
| 5,892,319 A | 4/1999 | Rossi | |
| 5,947,076 A | 9/1999 | Srinivasan et al. | |
| 6,013,973 A | 1/2000 | Sato | |
| 6,060,822 A | 5/2000 | Krupa et al. | |
| 6,064,144 A | 5/2000 | Knoll et al. | |
| 6,095,111 A * | 8/2000 | Ueda | F02B 19/108 123/254 |
| 6,129,069 A | 10/2000 | Uitenbroek | |
| 6,129,152 A | 10/2000 | Hosie et al. | |
| 6,130,498 A | 10/2000 | Shimizu et al. | |
| 6,198,209 B1 | 3/2001 | Baldwin et al. | |
| 6,279,550 B1 * | 8/2001 | Bryant | F01B 7/12 123/316 |
| 6,302,067 B1 | 10/2001 | Merritt | |
| 6,305,346 B1 | 10/2001 | Ueda et al. | |
| 6,318,335 B2 | 11/2001 | Tomczyk | |
| 6,326,719 B1 | 12/2001 | Boehler et al. | |
| 6,340,013 B1 | 1/2002 | Britton | |
| 6,460,506 B1 | 10/2002 | Nevinger | |
| 6,463,890 B1 * | 10/2002 | Chomiak | F02B 47/02 123/25 P |
| 6,495,948 B1 | 12/2002 | Garrett, III | |
| 6,554,016 B2 | 4/2003 | Kinder | |
| 6,574,961 B2 * | 6/2003 | Shiraishi | F01N 3/28 60/602 |
| 6,595,182 B2 * | 7/2003 | Oprea | F02B 19/12 123/295 |
| 6,611,083 B2 | 8/2003 | LaBarge et al. | |
| 6,670,740 B2 | 12/2003 | Landon, Jr. | |
| 6,749,172 B2 | 6/2004 | Kinder | |
| 6,830,017 B2 | 12/2004 | Wolf et al. | |
| 6,913,092 B2 | 7/2005 | Bourgoyne et al. | |
| 7,004,444 B2 | 2/2006 | Kinder | |
| 7,007,661 B2 * | 3/2006 | Warlick | F02D 19/0631 123/27 GE |
| 7,007,913 B2 | 3/2006 | Kinder | |
| 7,025,036 B2 * | 4/2006 | Lampard | F02B 19/02 123/261 |
| 7,086,376 B2 * | 8/2006 | McKay | F02M 51/0671 123/297 |
| 7,100,567 B1 | 9/2006 | Bailey et al. | |
| 7,104,245 B2 | 9/2006 | Robinet et al. | |
| 7,367,307 B2 | 5/2008 | Lampard | |
| 7,370,626 B2 * | 5/2008 | Schubert | F02B 19/12 123/209 |
| 7,408,293 B2 | 8/2008 | Francesconi et al. | |
| 7,409,933 B2 | 8/2008 | Nino | |
| 7,438,043 B2 * | 10/2008 | Shiraishi | F02B 19/12 123/260 |
| 7,615,914 B2 | 11/2009 | Francesconi et al. | |
| 7,628,130 B2 | 12/2009 | Johng | |
| 7,659,655 B2 | 2/2010 | Tozzi et al. | |
| 7,743,753 B2 * | 6/2010 | Fiveland | F02B 7/06 123/543 |
| 7,762,320 B2 | 7/2010 | Williams | |
| 7,848,871 B2 * | 12/2010 | Onishi | F02D 41/1458 123/585 |
| 7,856,956 B2 | 12/2010 | Inoue et al. | |
| 7,891,426 B2 | 2/2011 | Williams | |
| 7,922,551 B2 | 4/2011 | Tozzi | |
| 7,950,364 B2 | 5/2011 | Nerheim | |
| 8,033,335 B2 | 10/2011 | Orbell et al. | |
| 8,143,772 B2 | 3/2012 | Francesconi | |
| 8,181,617 B2 | 5/2012 | Kuhnert et al. | |
| 8,261,711 B2 | 9/2012 | Shimoda | |
| 8,286,734 B2 | 10/2012 | Hannegan et al. | |
| 8,313,324 B2 | 11/2012 | Bulat et al. | |
| 8,322,432 B2 | 12/2012 | Bailey et al. | |
| 8,353,337 B2 | 1/2013 | Bailey et al. | |
| 8,387,587 B2 * | 3/2013 | Ogata | F02B 23/104 123/299 |
| 8,499,854 B2 | 8/2013 | Mitchell et al. | |
| 8,584,648 B2 | 11/2013 | Chiera et al. | |
| 8,733,331 B2 * | 5/2014 | McAlister | F02M 51/0675 123/623 |
| 8,757,129 B1 * | 6/2014 | Hill | F02B 31/04 123/297 |
| 8,800,536 B2 * | 8/2014 | Plata | C01B 13/11 123/536 |
| 8,839,762 B1 | 9/2014 | Chiera et al. | |
| 8,857,405 B2 * | 10/2014 | Attard | F02B 19/12 123/261 |
| 8,890,396 B2 | 11/2014 | Ernst et al. | |
| 8,924,136 B2 * | 12/2014 | Nakamoto | F02D 41/009 123/179.4 |
| 8,925,518 B1 * | 1/2015 | Riley | F02B 19/10 123/261 |
| 9,172,216 B2 | 10/2015 | Ernst | |
| 2003/0196634 A1 * | 10/2003 | Lausch | F02B 1/12 123/260 |
| 2004/0061421 A1 | 4/2004 | Morita et al. | |
| 2004/0100179 A1 | 5/2004 | Boley et al. | |
| 2004/0123849 A1 * | 7/2004 | Bryant | F01B 7/12 123/563 |
| 2004/0177837 A1 * | 9/2004 | Bryant | F02B 29/0412 123/559.1 |
| 2005/0000484 A1 | 1/2005 | Schultz et al. | |
| 2005/0092285 A1 | 5/2005 | Klonis et al. | |
| 2005/0172929 A1 * | 8/2005 | Strauss | F02B 17/005 123/260 |
| 2005/0211217 A1 | 9/2005 | Boley et al. | |
| 2005/0224606 A1 * | 10/2005 | Dingle | F02B 19/14 239/533.2 |
| 2005/0279321 A1 * | 12/2005 | Crawford | F02B 23/0657 123/260 |
| 2006/0005803 A1 | 1/2006 | Robinet et al. | |
| 2006/0278195 A1 * | 12/2006 | Hotta | C01B 3/22 123/274 |
| 2007/0069617 A1 | 3/2007 | Tozzi et al. | |
| 2007/0151540 A1 * | 7/2007 | Takahashi | F02B 19/12 123/267 |
| 2007/0169737 A1 | 7/2007 | Gong et al. | |
| 2007/0236122 A1 | 10/2007 | Borror | |
| 2007/0261672 A1 * | 11/2007 | Lippert | F02D 37/02 123/445 |
| 2008/0017165 A1 * | 1/2008 | Schubert | F02B 19/12 123/254 |
| 2008/0168963 A1 * | 7/2008 | Gagliano | F02B 19/1014 123/267 |
| 2008/0257301 A1 * | 10/2008 | Hotta | C01B 3/26 123/253 |
| 2009/0236144 A1 | 9/2009 | Todd et al. | |
| 2009/0241896 A1 * | 10/2009 | Fiveland | F02B 7/06 123/305 |

(56) References Cited

U.S. PATENT DOCUMENTS

| | | |
|---|---|---|
| 2009/0309475 A1 | 12/2009 | Tozzi |
| 2010/0132660 A1* | 6/2010 | Nerheim ............ F02B 19/1014 123/260 |
| 2010/0133977 A1 | 6/2010 | Kato |
| 2010/0147259 A1 | 6/2010 | Kuhnert et al. |
| 2010/0192909 A1* | 8/2010 | Ikeda .................. F02B 23/0657 123/436 |
| 2011/0036638 A1 | 2/2011 | Sokol et al. |
| 2011/0062850 A1 | 3/2011 | Tozzi |
| 2011/0065350 A1 | 3/2011 | Burke |
| 2011/0089803 A1 | 4/2011 | Francesconi |
| 2011/0148274 A1 | 6/2011 | Ernst et al. |
| 2011/0297121 A1 | 12/2011 | Kraus et al. |
| 2011/0308489 A1 | 12/2011 | Herden |
| 2011/0320108 A1* | 12/2011 | Morinaga ........... F02D 41/0057 701/105 |
| 2012/0000664 A1 | 1/2012 | Nas et al. |
| 2012/0013133 A1 | 1/2012 | Rios, III et al. |
| 2012/0064465 A1 | 3/2012 | Borissov et al. |
| 2012/0103302 A1* | 5/2012 | Attard .................... F02B 19/12 123/260 |
| 2012/0118262 A1* | 5/2012 | Johnson .............. F02B 19/1009 123/260 |
| 2012/0125279 A1 | 5/2012 | Hampson et al. |
| 2012/0125287 A1* | 5/2012 | Chiera .................... F02B 19/12 123/254 |
| 2012/0125636 A1 | 5/2012 | Linde et al. |
| 2012/0299459 A1 | 11/2012 | Sakakura |
| 2012/0310510 A1* | 12/2012 | Imamura ........... F02D 41/0027 701/104 |
| 2013/0000598 A1* | 1/2013 | Tokuoka ............ F02B 19/1023 123/254 |
| 2013/0042834 A9 | 2/2013 | Chiera et al. |
| 2013/0047954 A1* | 2/2013 | McAlister .............. F02M 57/06 123/297 |
| 2013/0055986 A1 | 3/2013 | Tozzi et al. |
| 2013/0099653 A1 | 4/2013 | Ernst |
| 2013/0139784 A1 | 6/2013 | Pierz |
| 2013/0160734 A1 | 6/2013 | Redtenbacher et al. |
| 2013/0179050 A1* | 7/2013 | Munshi ................... F02B 43/10 701/104 |
| 2013/0192896 A1 | 8/2013 | Bailey et al. |
| 2013/0206122 A1* | 8/2013 | Chiera .................... H01T 13/54 123/594 |
| 2013/0220269 A1* | 8/2013 | Woo ........................ F02B 19/06 123/260 |
| 2014/0026846 A1* | 1/2014 | Johnson .............. F02B 19/1009 123/260 |
| 2014/0032081 A1 | 1/2014 | Willi et al. |
| 2014/0076274 A1 | 3/2014 | Tozzi et al. |
| 2014/0083391 A1 | 3/2014 | Gruber |
| 2014/0102404 A1 | 4/2014 | Sotiropoulou et al. |
| 2014/0137840 A1* | 5/2014 | McAlister .............. F02M 57/06 123/445 |
| 2014/0144406 A1* | 5/2014 | Schock .................... F02B 19/12 123/260 |
| 2014/0165980 A1 | 6/2014 | Chiera et al. |
| 2014/0190437 A1 | 7/2014 | Chiera et al. |
| 2014/0209057 A1* | 7/2014 | Pouring ................... F02B 19/12 123/257 |
| 2014/0261294 A1* | 9/2014 | Thomassin ............. F02B 53/10 123/209 |
| 2015/0020769 A1* | 1/2015 | Huang ..................... F02B 7/08 123/305 |
| 2015/0040845 A1 | 2/2015 | Chiera et al. |
| 2015/0068489 A1* | 3/2015 | Bunce ................. F02B 19/1057 123/262 |
| 2015/0075506 A1* | 3/2015 | Ishida ................... F02D 41/402 123/65 R |
| 2015/0128898 A1* | 5/2015 | Osaka ..................... F02B 19/08 123/263 |
| 2015/0167576 A1 | 6/2015 | Glugla et al. |
| 2015/0260131 A1* | 9/2015 | Riley ..................... F02M 31/20 123/253 |
| 2015/0267631 A1* | 9/2015 | Miyamoto ........... F02D 41/3094 123/445 |
| 2015/0354481 A1* | 12/2015 | Geckler ................ F02B 19/108 60/278 |
| 2016/0010538 A1* | 1/2016 | Suzuki ................ F02B 19/1085 123/292 |
| 2016/0017845 A1* | 1/2016 | Huang ............... F02M 21/0209 290/1 A |
| 2016/0024994 A1* | 1/2016 | Engineer ............. F02B 19/1009 123/256 |
| 2016/0047323 A1* | 2/2016 | Suzuki .................. F02P 5/1502 60/285 |
| 2016/0053668 A1* | 2/2016 | Loetz .................. F02B 19/1085 123/260 |

FOREIGN PATENT DOCUMENTS

| | | |
|---|---|---|
| CA | 1010329 | 5/1977 |
| CA | 2320415 | 3/2001 |
| CN | 2825995 | 10/2006 |
| DE | 31 20 007 | 12/1982 |
| DE | 3230793 | 2/1984 |
| DE | 3913665 | 10/1990 |
| DE | 4422939 | 1/1996 |
| DE | 19624965 | 1/1998 |
| DE | 10143209 | 6/2002 |
| DE | 101 44 976 | 4/2003 |
| DE | 102010004851 | 6/2011 |
| DE | 102011006597 A1 | 3/2012 |
| DE | 102012021842 B4 | 9/2014 |
| EP | 0216027 A1 | 4/1987 |
| EP | 0 675 272 | 10/1995 |
| EP | 0971107 | 1/2000 |
| EP | 1026800 A2 | 8/2000 |
| EP | 1028506 A1 | 8/2000 |
| EP | 0937196 | 9/2000 |
| EP | 1265329 | 12/2002 |
| EP | 1556592 | 10/2003 |
| EP | 1556932 | 7/2005 |
| EP | 1701419 | 9/2006 |
| FI | 121759 | 3/2011 |
| FI | 122501 | 2/2012 |
| FR | 577766 A | 9/1924 |
| FR | 764079 A | 5/1934 |
| FR | 985788 A | 7/1951 |
| FR | 2071129 A5 | 9/1971 |
| FR | 2131938 A2 | 11/1972 |
| FR | 2131938 B2 | 8/1979 |
| FR | 2846042 | 4/2004 |
| GB | 588074 | 5/1947 |
| JP | 50077738 | 6/1975 |
| JP | S5252013 | 4/1977 |
| JP | 57-018283 | 1/1982 |
| JP | 58162719 | 9/1983 |
| JP | H02148588 | 12/1990 |
| JP | 03-011575 | 1/1992 |
| JP | 4133281 | 5/1992 |
| JP | 4262388 | 9/1992 |
| JP | 08-260970 | 10/1996 |
| JP | 09166024 | 6/1997 |
| JP | 2008-504649 | 2/2006 |
| KR | 20140117152 A | 10/2014 |
| RU | 2116474 | 7/1998 |
| SU | 968493 | 10/1982 |
| SU | 1370269 | 1/1988 |
| WO | WO 87/07777 | 12/1987 |
| WO | WO 91/06142 | 5/1991 |
| WO | WO 92/02718 | 2/1992 |
| WO | WO 2004/036013 | 4/2004 |
| WO | WO 2004/036709 | 4/2004 |
| WO | WO 2004/107518 | 12/2004 |
| WO | WO 2006/011950 | 2/2006 |
| WO | WO 2009/060119 A1 | 5/2009 |
| WO | WO 2009/109694 A2 | 9/2009 |
| WO | WO 2009/130376 A1 | 10/2009 |
| WO | WO 2010/072519 | 7/2010 |

(56) References Cited

FOREIGN PATENT DOCUMENTS

| WO | WO 2011/031136 | | 3/2011 | |
|----|----|----|----|----|
| WO | WO 2011/085853 | | 7/2011 | |
| WO | WO 2011/101541 | | 8/2011 | |
| WO | WO 2011/128190 | | 10/2011 | |
| WO | WO 2011/151035 | | 12/2011 | |
| WO | WO 2012/21914 | A1 | 2/2012 | |
| WO | WO 2012/091739 | | 7/2012 | |
| WO | WO2014/201030 | | 12/2014 | |
| WO | WO2015/138987 | A1 | 9/2015 | |
| WO | WO 2015138987 | A1 * | 9/2015 | ......... F02M 21/0281 |

OTHER PUBLICATIONS

Sachin Joshi et al., "On Comparative Performance Testing of Prechamber and Open Chamber Laser Ignition" Journal of Engineering for Gas Turbines and Power, Dec. 2011, vol. 133, pp. 122801-1 to 122801-5.

McIntyre, Dustin L., et al., "Lean-Burn Stationary Natural Gas Reciprocating Engine Operation with a Prototype Miniature Diode Side Pumped Passively Q-Switched Laser Spark Plug" U.S. Department of Energy, National Energy Technology Laboratory, 2008, 14 pages.

Dale, J.D. et al., "Enhanced Ignition for I. C. Engines With Premixed Charge," Lawrence Berkeley Laboratory, Society of Automotive Engineers Annual Congress, Oct. 1980, 52 pages.

"New Spark Plug Concepts for Modern-Day Gasoline Engines," Beru Aktiengesellschaft, MTZ vol. 68, Feb. 2007, 8 pages.

BorgWarner BERU Systems Pre-Chamber Technology, 1 page.

BorgWarner BERU Systems, BERU Industrial Spark Plugs, Feb. 2012, 48 pages.

Maria-Emmanuella McCoole, M.Sc.E.E. et al.; Solutions for Improving Spark Plug Life in High Efficiency, High Power Density, Natural Gas Engines; Proceedings of ICES2006; ASME Internal Combustion Engine Division 2006 Spring Technical Conference; May 8-10, 2006, Aachen, Germany; ICES2006-1417; pp. 1-8.

Dr. Luigi Tozzi et al.; Advanced Combustion System Solutions for Increasing Thermal Efficiency in Natural Gas Engines While Meeting Future Demand for Low NOx Emissions; Proceedings of JRCICE2007; 2007 ASME/IEEE Joint Rail Conference & Internal Combustion Engine Spring Technical Conference; Mar. 13-16, 2006, Pueblo, Colorado USA; JRCICE2007-40026; pp. 1-7.

Jessica Adair et al; Knock Characterization Using Ionization Detection; GMRC Gas Machinery Conference; Oklahoma City, Oklahoma; Oct. 2006; pp. 1-23.

Hironori Osamura, Development of Long Life and High Ignitability iridium Spark Plug, Technical Paper, Seoul 2000 FISITA World Automotive Congress; Jun. 12-15, 2000 Seoul, Korea; 6 pages.

Hironori Osamura, Development of New Iridium Alloy for Spark Plug Electrodes; SAE Technical Paper Series; 1999-1-0796; SI Engine Components and Technology (SP-1437); International Congress and Exposition Mar. 1-4, 1999; 14 pages.

"Wartsila 34SG Engine Technology for Compressor Drive," Wartsila Engines, Wartsila Corporation 2009, 16 pages.

Federal Mogul, Champion® Bridge Iridium Spark Plug, Industrial Gas Stationary Engines—High Demand/Premium Market, Jun. 2012, 1 page.

BOSCH, Spark Plugs Technical Information, published on or before Nov. 28, 2014, 28 pages.

Chiera et al., "Cap Shielded Ignition System", U.S. Appl. No. 14/664,431, Mar. 20, 2015, 22 pages.

PCT International Search Report and Written Opinion of the International Searching Authority, PCT/US2016/059159, dated Jan. 19, 2017, 13 pages.

* cited by examiner

GASEOUS FUEL COMBUSTION

BACKGROUND

The concepts herein relate to gaseous fuel combustion for internal combustion engines.

There is a push to utilize natural gas as an engine fuel due to its low cost. Relative to diesel fuel, for instance, natural gas is a lower cost fuel per energy. To take advantage of the lower cost of natural gas, many engines are designed specifically to run on natural gas. Additionally, some engines originally designed to use diesel fuel can be retrofitted to use natural gas as fuel.

Diesel engines have high compression ratios and use compression ignition to ignite the diesel fuel charge. Natural gas is typically ignited with a spark plug. However, the ignition energy from the spark plug does not always effectively ignite the natural gas at high compression ratios, particularly at lean operating conditions. For example, the high velocity of the direct-injected natural gas tends to quench the developing flame kernel. To remedy this, some systems forgo a spark plug and use diesel fuel as a pilot fuel. In other words, these systems inject a small amount of diesel fuel as a pilot fuel early in the compression cycle that auto-ignites from the compression. Natural gas is then by injected and ignited by the combusting pilot fuel. However, a natural gas system using diesel as a pilot fuel requires two fuel systems and associated piping, storage, injectors, etc., which can increase cost, size, complexity and makes retrofitting difficult.

DESCRIPTION OF DRAWINGS

Like reference symbols in the various drawings indicate like elements.

DETAILED DESCRIPTION

Figure 1:
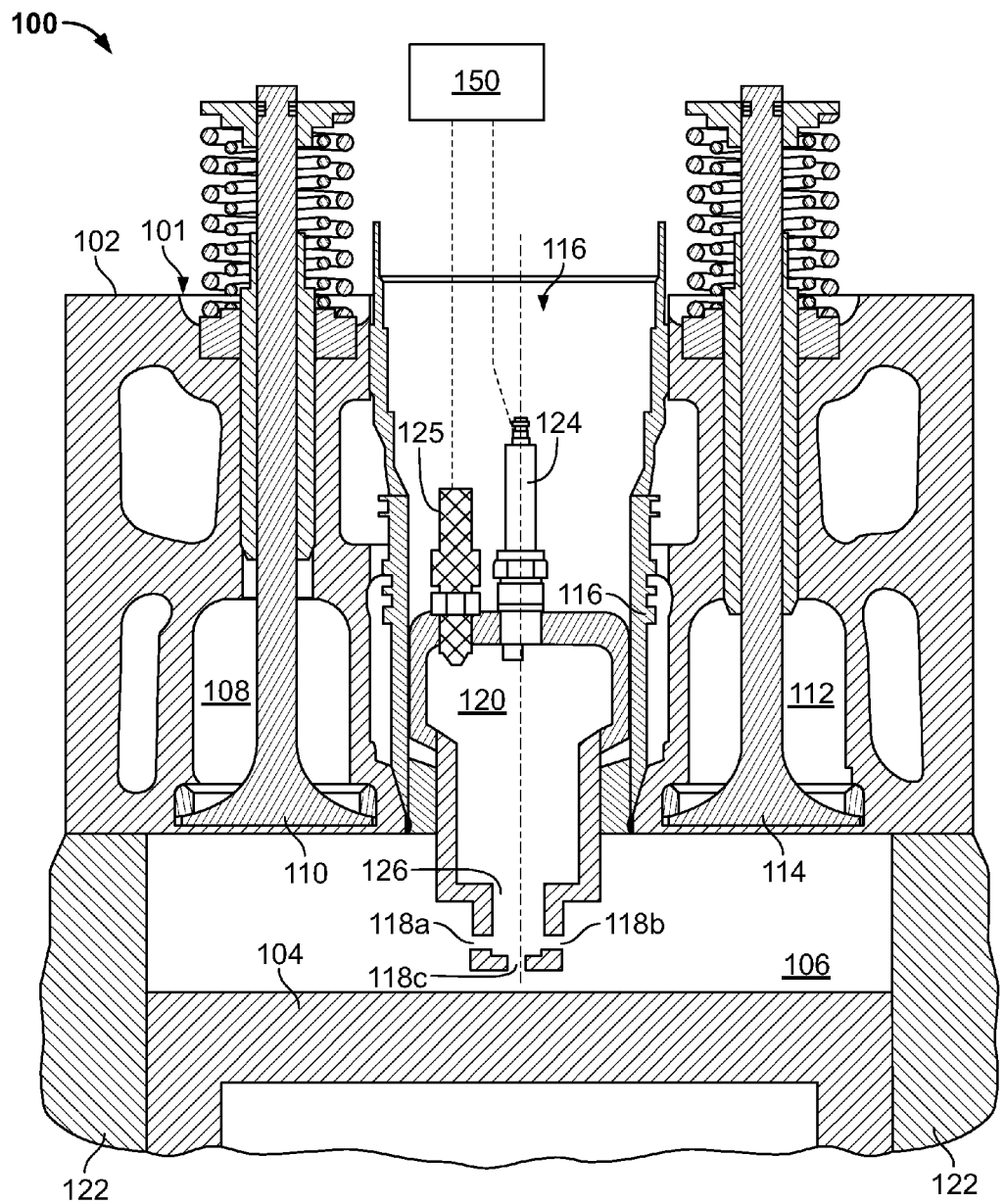
FIG. 1 is a schematic side cross-sectional view of a portion of an internal combustion engine system.

FIG. 1 shows a cross-section of a portion of an example internal combustion engine system 100. The example engine system 100 includes an internal combustion engine 101 that is a reciprocating engine and includes a head 102, a block 122, and a piston 104. The piston 104 is located inside a cylinder defined inside the block 122. The piston 104 is carried to reciprocate inside the cylinder during engine operation and its movement drives a crank (not shown) and movement of the crank drives the piston 104. A main combustion chamber 106 is a volume located inside the cylinder between the head 102 and the piston 104, and is bounded by the block 122. FIG. 1 is a cross-section of one piston 104 in a cylinder. The engine 101, however, can include one, two or more similar pistons 104 in a cylinder coupled to the crank.

The example internal combustion engine 101 includes an air intake passage 108 with intake valve 110 and an exhaust passage 112 with exhaust valve 114. The passages 108, 112 are in the head 102 adjacent to the main combustion chamber 106, and the valves 110, 114 form part of the walls of the main combustion chamber 106. The intake valve 110 opens to admit air and a fuel injector 125 operates to inject fuel to form the air/fuel mixture in the main combustion chamber 106. After combustion, the exhaust valve 114 opens to exhaust combustion residuals out of the main combustion chamber 106 and into the exhaust passage 112. Although the concepts herein are described herein with respect to a reciprocating internal combustion engine, the concepts could be applied to other internal combustion engine configurations.

The example internal combustion engine 101 includes an example engine fuel injector-igniter assembly 116. The engine fuel injector-igniter assembly 116 includes a fuel injector 125 and an example igniter plug 124. The fuel injector 125 is arranged for direct injection, meaning that the injector 125 injects fuel directly into the combustion chamber (here, the main combustion chamber 106 and a pre-combustion chamber 120), rather than into or upstream from the air intake passage 108. In certain instances, the engine 101 can additionally include an injector or other fueling device, not arranged for direct injection, that is coupled to a source of gaseous fuel to introduce the fuel into or upstream from the air intake passage 108.

The example injector-igniter assembly 116 is a generally elongate enclosure located in the head 102 and is threadingly and/or otherwise coupled to the head 102. In some instances, the injector-igniter assembly 116 can extend into the main combustion chamber 106, be flush with a wall of combustion chamber 106, or be recessed from a wall of main combustion chamber 106. The example igniter plug 124 is received inside the example injector-igniter assembly 116 and is coupled to the injector-igniter assembly 116 threadingly and/or otherwise. The injector-igniter assembly 116 defines an outer enclosure around the igniter plug 124 and the fuel injector 125.

A pre-combustion chamber 120 encloses an outlet of the fuel injector 125 and the igniter 124. FIG. 1 shows the pre-combustion chamber 120 as an outer chamber inside the injector-igniter assembly 116 adjacent to but separate from the main combustion chamber 106. However, in some instances, the pre-combustion chamber 120 can be formed in the head 102 itself and the injector-igniter assembly 116 can be omitted or the pre-combustion chamber 120 can be integrated with the igniter plug 124 (e.g., in a common or conjoined housing or enclosure). The pre-combustion chamber 120 is shown having a generally symmetrical cylindrical shape about the centerline of the injector-igniter assembly 116, but in other instances the pre-chamber 120 could be an asymmetrical shape. In some instances, the centerline of the pre-chamber 120 coincides with the centerline of the injector-igniter assembly 116, but in other instances the pre-chamber is offset or at a non-parallel angle relative to the centerline of the injector-igniter assembly 116.

The example injector-igniter assembly 116 includes jet apertures 118a-c. The jet apertures 118a-c are in fluid communication between the interior of the pre-chamber 120 and the exterior of the pre-chamber 120. Three jet apertures 118a-c are visible in this cross section, yet fewer or more could be provided. The jet apertures 118a-c converge to a central passage 126 that opens into the pre-combustion chamber 120. The central passage 126 is an axial interior passage that extends from jet apertures 118a-c, along the centerline of the injector-igniter assembly 116, to the pre-combustion chamber 120. The central passage 126 channels flow along the centerline of the injector-igniter assembly 116, and as shown, the greatest transverse dimension of the passage 126 is smaller than the greatest transverse dimension of the remainder of the pre-combustion chamber 120. The jet apertures 118a-c can number one or more, including one or more that are laterally oriented (e.g., jet apertures 118a-b) and/or one or more that are axially oriented (e.g., jet aperture 118c), and can be located on the injector-igniter assembly 116 in a symmetric or asymmetric pattern. The jet apertures 118a-c allow charge, flame, and residuals to flow between the injector-igniter assembly 120 and the main combustion chamber 106. As discussed in more detail below, air/fuel mixture from combustion chamber 106 is ingested into the precombustion chamber 120 through the jet apertures 118a-c and the central passage 126 operates to channel the flow along the centerline of the injector-igniter assembly 116 to the igniter plug 124. In certain instances, the central passage 126 channels the flow of air/fuel mixture directly into the ignition gap of the igniter plug 124 and/or through a center jet aperture of an enclosure around the ignition gap of the igniter plug 124. Then, after the air/fuel mixture in the pre-chamber 120 is ignited, the jet apertures 118a-c and central passage 126 operate as jet passages to nozzle combusting air/fuel mixture from the pre-chamber 120 into divergent flame jets that reach deep into the main combustion chamber 106 and ignite the fuel in the main combustion chamber 106.

The fuel injector 125 is coupled to a fuel source (not shown) of one or more gaseous fuels (e.g., gaseous methane, natural gas, biogas, landfill gas, propane or other gaseous fuels or short chain hydrocarbons referred to as fuel gas) and is configured to directly inject the gaseous fuel into the pre-chamber 120 during the compression stroke of the piston 104. The lateral jet apertures 118a-b can be oriented more laterally than axially or at a 45 degree angle to axially to reduce amount of fuel injected into the main combustion chamber 106 that is directed into or collects in the corners or crevices at the interface between the piston 104 and the combustion chamber 106. Additionally or alternatively, the diameter of the axial jet aperture 118c can be made relatively larger than the diameters of the lateral jet apertures 118a-b, so that a smaller portion of the injected fuel flows through each of the lateral jet apertures 118a-b than through the central axial passage 118c to distribute the fuel more homogenously in the main combustion chamber 106.

The igniter plug 124 is a device configured to initiate a flame kernel to ignite the air/fuel mixture in the combustion chamber 106, such as a spark plug, hot surface igniter, laser igniter, and/or other type of igniter. In some implementations, the igniter plug 124 includes an additional enclosure separate from the pre-chamber 120 that forms a chamber enclosing the location of ignition. Some examples of igniter plugs that could be used as igniter plug 124 are described in US 2014/0190437, entitled "Quiescent Chamber Hot Gas Igniter," and U.S. Pat. No. 8,584,648, entitled "Controlled Spark Ignited Flame Kernel Flow." Other configurations of igniter are also within the concepts herein.

The example engine system 100 also includes a controller 150 that is communicatively coupled to the injector-igniter assembly 116. The controller 150 can send signals to the injector-igniter assembly 116 to inject fuel through the fuel injector 125 into the pre-combustion chamber 120. In some implementations, the controller 150 signals the injector-igniter assembly 116 to inject fuel multiple times as multiple separate fuel injection events. The controller 150 can time the signals such that the fuel is injected for a particular duration of time. The controller 150 can also signal the igniter plug 124 to ignite the mixed fuel and air in the pre-chamber 120. The controller 150 can send signals of different types in any order. For example, the controller 150 can send one or more signals to inject fuel and send one or more of signals to operate the igniter. In some implementations, the controller 150 simultaneously sends signals to inject fuel and signals to ignite. The controller 150 can be included as part of the engine system 100 or as part of the injector-igniter assembly 116 or as part of another system.

Figure 2:
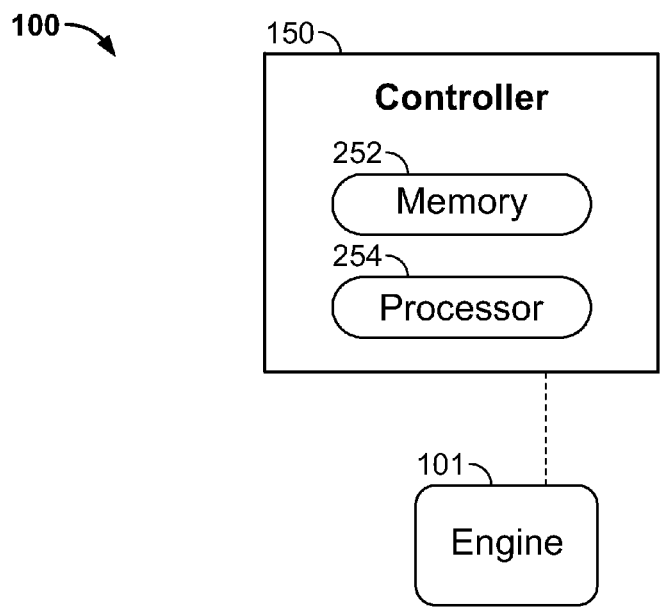
FIG. 2 is a schematic of an example engine system.

FIG. 2 shows a schematic of controller 150 that is communicatively coupled to an example engine 101. The controller 150 can send signals to the engine 101 to trigger fuel injection and/or ignition events. The controller 150 includes a memory 252 and a processor 254. The memory 252 is a computer-readable medium that stores instructions, such as instructions to perform the methods described herein, that are operable to be performed by the processor 254. The processor 254, for example, can be a computer, circuitry, a microprocessor, or another type of data processing apparatus. In some implementations, some or all of the controller 150 is integrated with the engine system 100.

The example engine fuel injector-igniter assembly 116 can enable the engine 100 to operate using a gaseous fuel without a second fuel (e.g., pilot fuel) of a different type. For example, the injector-igniter assembly 116 can allow the engine 101 to operate using a gaseous fuel (e.g., natural gas) without also using a diesel fuel as a pilot fuel. In some cases, the injector-igniter assembly 116 can be installed or retrofit onto a diesel engine to enable the engine to operate using all gaseous fuel. For example, the head of a diesel engine could be replaced with another head that includes an injector-igniter assembly such as injector-igniter assembly 116. Alternately, an injector-igniter assembly 116 could replace the injection system of a diesel engine, or an injector-igniter assembly 116 could be installed along with an existing injection system. In this manner, an all-diesel engine or a partly-diesel engine can be converted to an all-gaseous-fuel engine by using an injector-igniter assembly while retaining the diesel compression ratio during engine operation.

Figure 3:
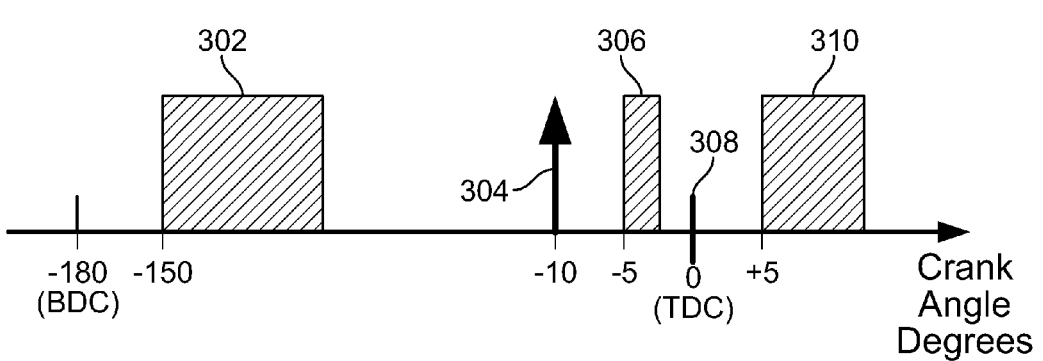
FIG. 3 is a timing diagram of engine cycle.

Referring now to FIGS. 3 and 4A-D, the injector-igniter assembly injects gaseous fuel at multiple separate instances to facilitate combustion. FIG. 3 shows a timing diagram of an example sequence 300 of a portion of an engine cycle including fuel injections 302, 306, 310 and an ignition event 304. Were it shown in full, in a four stroke engine, the entire engine cycle includes intake of air, compression of the combustion chamber contents, a power stroke where the piston in forced downward by combustion of the air/fuel charge, and exhaust where the contents of the combustion chamber are exhausted. The fuel injections 302, 306, 310 and the ignition event 304 can, for example, be triggered by signals from a controller 150. FIGS. 4A-D show portions of a cycle of an engine 400 that is substantially similar to example engine 101 shown in FIG. 1. For example, the engine 400 includes an injector-igniter assembly 410 that includes a gaseous fuel injector 412 and an igniter plug 414. The engine 400 also includes a pre-combustion chamber 430 that is fluidly connected to the combustion chamber 402 through a central passage 432 and jet apertures 426.

Figure 4A:
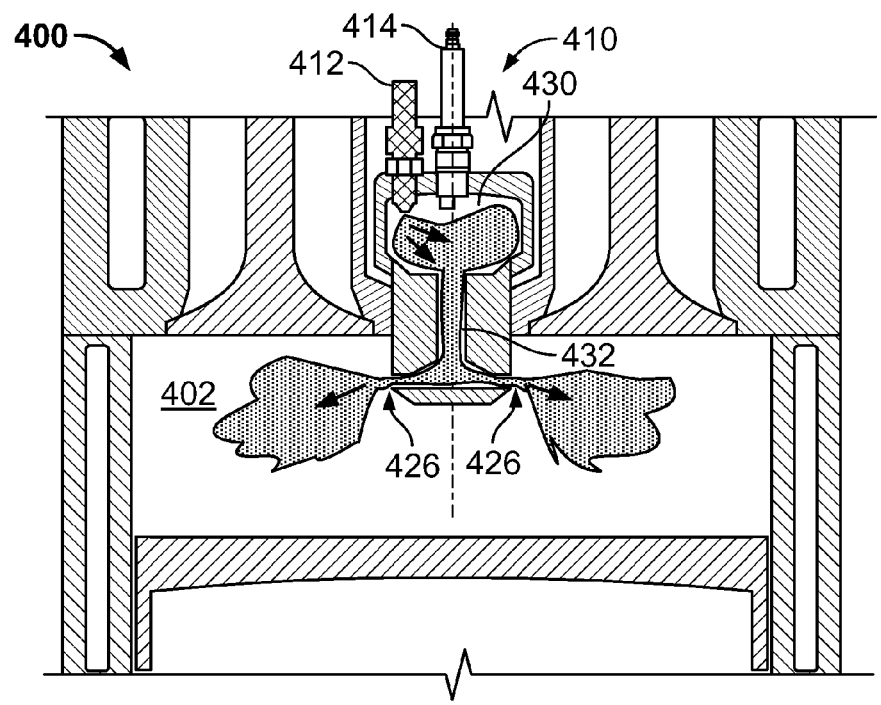
FIGS. 4A-4D are sequential cross-sectional views of a portion of an internal combustion engine during an engine cycle.

A first fuel injection 302 through the injector 412 occurs before the ignition event 304 and before the piston has reached top dead center 308 to charge the combustion chamber with a majority of its total fuel charge for the engine cycle. At this stage, the total air charge for the engine cycle has been admitted into the combustion chamber or is being admitted, and the fuel flows out of the pre-combustion chamber through the jet apertures 426 to mix with the air in the main combustion chamber. Alternatively, or in combination with an injection through injector 412, the first fuel injection 302 can be introduced through the air intake, for example, via a fuel injector or other fueling device that introduces fuel into or upstream of the air intake. In certain instances, the first ignition event 302 begins at −150 degrees from compression top dead center 308 (i.e., where the piston is at its highest point on its compression stroke), and then injection of fuel is ceased. However, the first ignition event 302 can occur at other times relative to compression top dead center 308. The quantity of fuel injected during the first fuel injection 302 is intended to provide a majority of the fuel charge for the engine cycle, yet keep the resulting air/fuel mixture below the pre-ignition threshold. In certain instances, 60%, 70%, 80%, or some other majority fraction of the total injected fuel in one engine cycle is injected. In certain instances, the air/fuel ratio in the main combustion chamber is lambda 1.5 or higher, where lambda is the ratio of ratio the actual air/fuel ratio to the stoichiometric ratio. FIG. 4A shows the portion of the engine 400 cycle at which the fuel injected at the first fuel injection 302 jets through the pre-combustion chamber 430 into the combustion chamber 402 through the jet apertures 426. As the first fuel injection 302 occurs before the ignition event 304, the fuel jetted into the combustion chamber 430 combines and mixes with the air in the combustion chamber 402. Because the resulting air/fuel mixture is below the pre-ignition threshold, it does not substantially pre-ignite due to heat and compression in the combustion chamber.

Figure 4B:
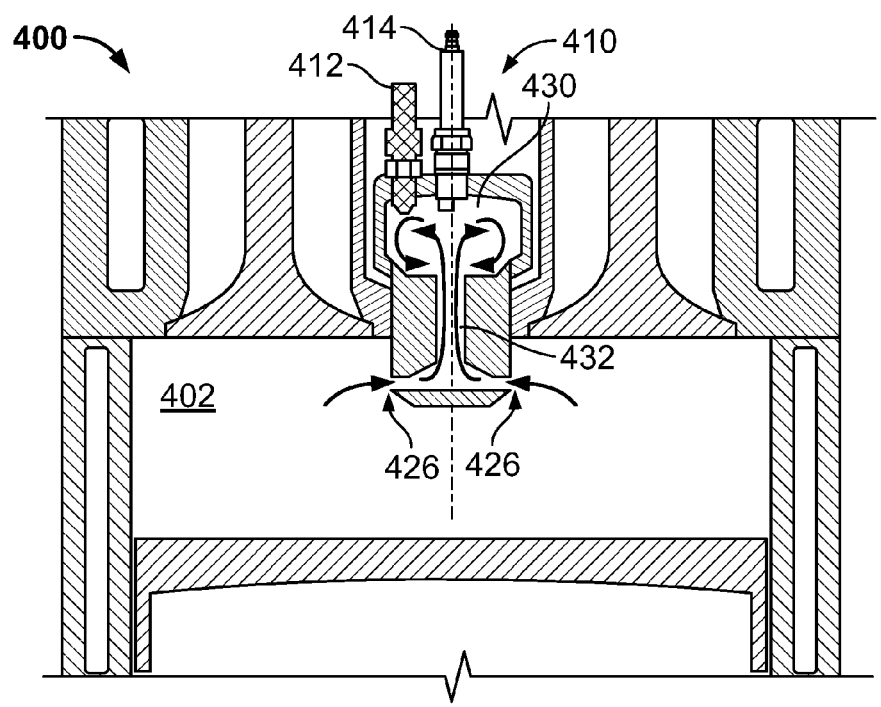

The first fuel injection 302 is phased such that the piston movement in compression drives the air/fuel mixture to be ingested from the combustion chamber 402 through the jet apertures 426 and into the pre-chamber 430. Some residual fuel from the first injection 302 remains in the pre-chamber 430 and enriches the air/fuel mixture ingested from the main combustion chamber. FIG. 4B shows example engine 400 during the compression cycle of the engine cycle in which the air/fuel mixture is driven into the pre-chamber 430. The central passage 432 channels, as shown in FIGS. 4A-D, the ingested air/fuel mixture to impinge on the igniter plug 414 and causes the incoming air/fuel mixture to turbulently circulate and mix in the pre-combustion chamber 430. In some cases, the jet apertures 426 can meet with the central passage 432 at an angle that smoothly transitions incoming flow through the jet apertures 426 into the central passage 432, for example, to reduce velocity losses into the pre-chamber 430.

At some time after the first fuel injection 302 and before the piston reaches top dead center 308, an ignition event 304 is triggered to begin igniting the air/fuel mixture in the pre-chamber 430. The ignition of the air/fuel mixture in the pre-chamber 430 is protected from the high velocity in the main combustion chamber. In certain instances, the ignition event can occur at −10 degrees (or some other time) from top dead center 308. With reference to engine 400 in FIGS. 4A-C, the ignition event 304 ignites the mixed gaseous fuel and air ingested into the pre-combustion chamber 430 from the combustion chamber 402. The increased pressure created in the pre-chamber 430 by the combustion causes the combusting air/fuel mixture to jet out the jet apertures 426 as flames and into the combustion chamber 402. The air/fuel mixture ignited in the pre-chamber 430 producing flame jets 424a, 424b operates like a "pilot charge" that ignites the mixture in the main combustion chamber.

After the ignition event 304, a second fuel injection 306 is triggered to provide additional fuel to the flaming jets produced by igniting the air/fuel mixture in the pre-chamber 430. The second fuel injection 306 enriches the mixture in the pre-chamber 430 for improved ignitability. The second fuel injection 306 occurs before compression top dead center 308, quickly after the ignition event 304, and contains a fraction of the remaining fuel to be injected during a cycle. After the second fuel injection 306, injection of fuel is paused to allow the flame in the pre-chamber 430 and jetting from the pre-chamber 430 to stabilize and grow. The amount of fuel in the second injection 306 is selected to be small enough that it tends to not quench the combusting mixture in the pre-chamber 430. In certain instances, if the first fuel injection 302 contains 70% of the total fuel to be injected during a cycle, the second fuel injection 306 may contain only 5% of the fuel to be injected. These are example proportions of fuel, of course; actual proportions of fuel can depend on the engine, the application, the desired combustion characteristics, or other factors. In certain instances, the second injection occurs at −5 degrees from top dead center 308 as shown in FIG. 3.

Figure 4C:
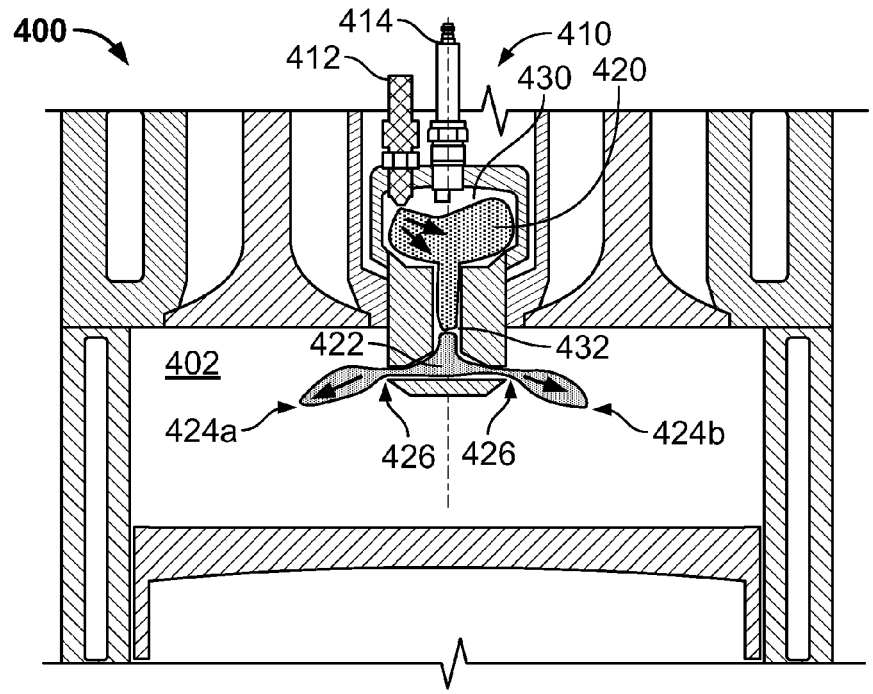
Figure 4D:
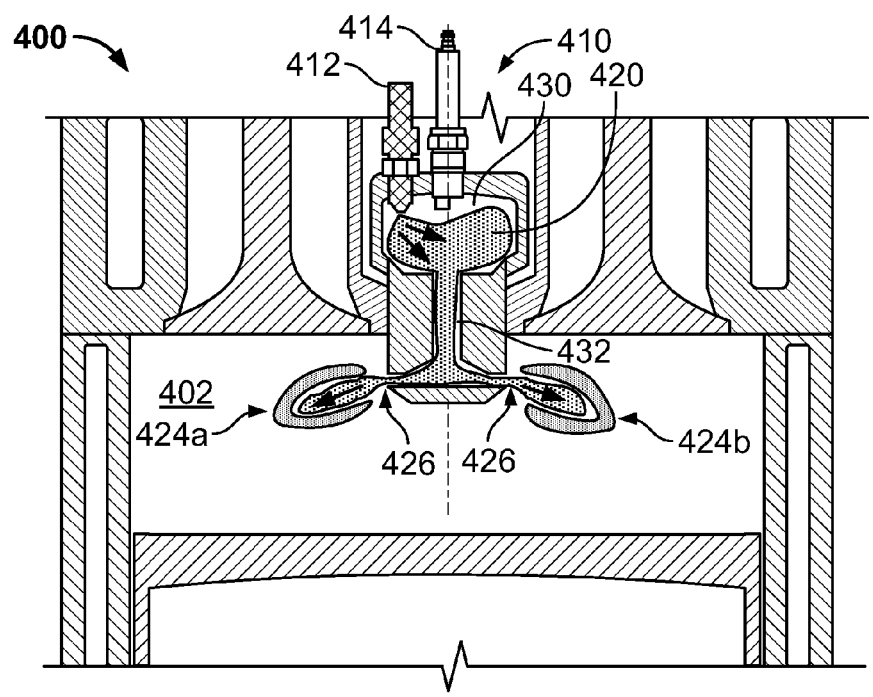

FIG. 4C shows the example engine 400 just after the second fuel injection 306. The second fuel injection 306 has injected fuel 420 behind the combustion air/fuel mixture 422, also aiding in expelling a portion of the ignited and air/fuel mixture 422 from the pre-combustion chamber through the jet apertures 426. FIG. 4D shows the engine 400 after the fuel 420 from the second fuel injection 306 has filled the pre-chamber and driven the flaming jets 424a, 424b out of the pre-chamber. As the fuel 420 flows through the jet apertures 426, the core of the flaming jets 424a, 424b are filled with the un-combusted fuel 420 from the second fuel injection 306. The flaming jets 424a, 424b ignite the cores of fuel 420 as a diffusion flame. Diffusion combustion is a relatively slow combustion, as the combustion is limited by the rate of diffusion of the air into the fuel, and thus can provide a slower, more controlled combustion event. The slower diffusion combustion occurring in the flaming jets 424a, 424b allows the flaming jets to combust more slowly to be more robust, stronger flames than flaming jets without a core of air/fuel mixture and diffusion combustion.

A third fuel injection 310 is then triggered to provide the remainder of the total fuel charge for the engine cycle. The third fuel injection 310 can occur after the piston has passed compression top dead center 308. In certain instances, the third fuel injection 310 occurs at +5 degrees from top dead center 308 as shown in FIG. 3. In some implementations, the third fuel injection 310 injects a quantity of fuel less than that of the first fuel injection 302 but larger than that of the second fuel injection 306. The third fuel injection 310 injects the remainder of the fuel used in a cycle of the engine, such that the first injection 302, second injection 306, and third injection 310 encompasses all of the gaseous fuel injected during a cycle of the engine. For example, the first fuel injection 302 can contain 70% of the total fuel to be injected, the second fuel injection 306 can contain 5% of the fuel, and the third fuel injection can contain the remaining 25% of the fuel. The third fuel injection 310 can be delayed a duration after the second fuel injection 306 (e.g., 5-10 crank angle degrees or another duration) to allow the flames to grow and move away from the injector 412. In certain instances, all or a portion of the third fuel injection 310 feeds the fuel core of the flaming jets 424a, 424b and then combusts in a diffusion flame.

In some implementations, the second and third injection 306, 310 events are combined into the second fuel injection 306 to provide benefits or characteristics of a third fuel injection 310, and a third fuel injection 310 is not used. In such an example, the second fuel injection 306 occurs after compression top dead center 308 and includes the remainder of the fuel injected during a cycle of the engine. For example, if the first fuel injection 302 contains 70% of the total fuel to be injected during a cycle, the second fuel injection 306 can contain the remaining 30% of the fuel.

Figure 5:
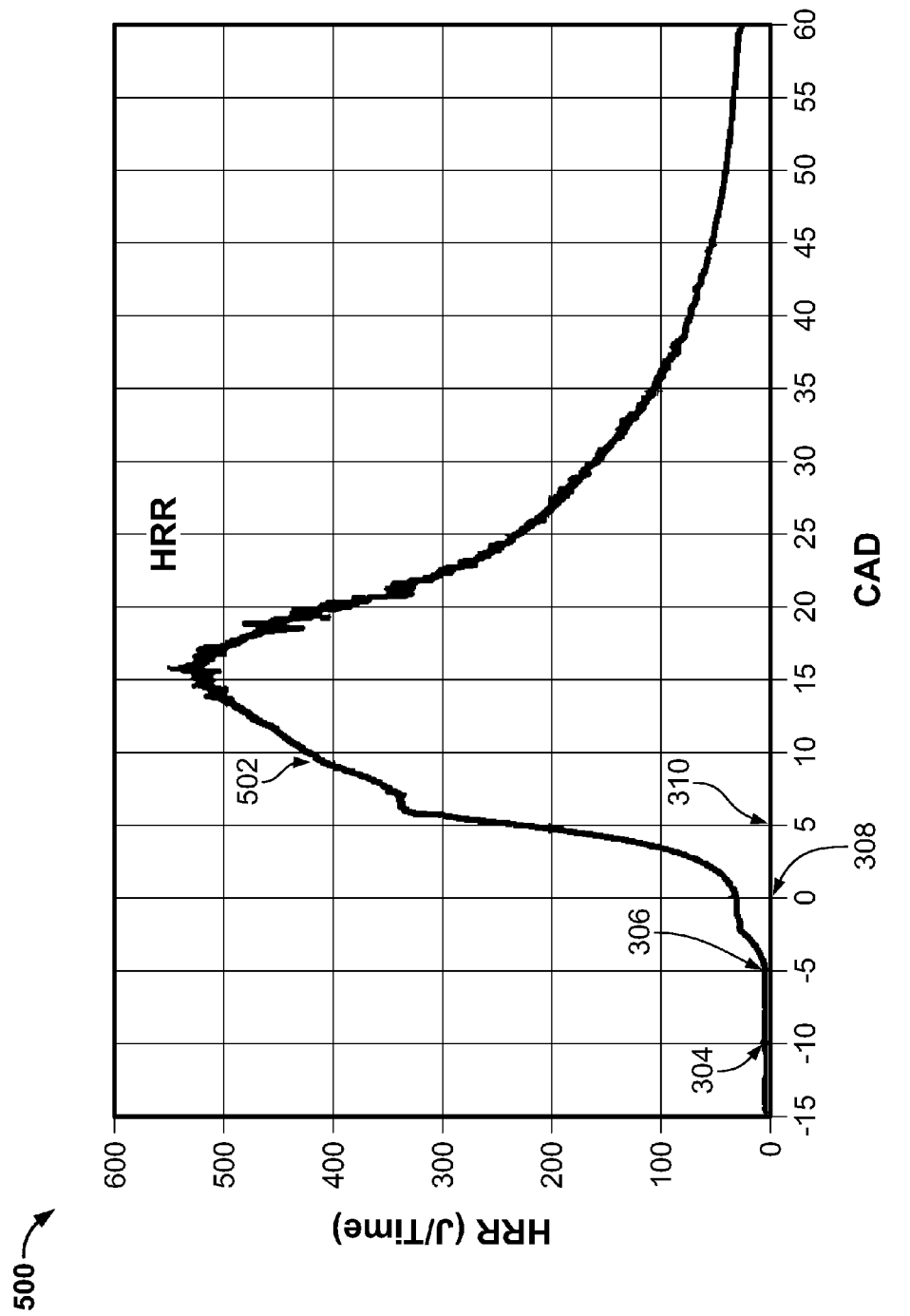
FIG. 5 shows a diagram of the heat release rate of an example combustion implementing multiple ignition events.

FIG. 5 shows a diagram 500 of the heat release rate of an example combustion implementing multiple ignition events as described in FIG. 3 and as implemented in engine 100 and engine 400 with an injector-igniter assembly. The heat release rate curve 502 is plotted against the crank angle degrees of an engine cycle. The curve 502 shows that the heat release rate increases rapidly after the second fuel injection 306 that occurs at −5 degrees from top dead center 308. In particular, the heat release rate increases the most rapidly approximately between top dead center 308 and the third ignition event 310 at +5 degrees. The diagram 500 indicates that the use of multiple injection events and an injector-igniter assembly as described can enable rapid combustion of gaseous fuel used in a diesel engine.

A number of implementations have been described. Nevertheless, it will be understood that various modifications may be made. Accordingly, other implementations are within the scope of the following claims.

What is claimed is:

1. A method of combusting gaseous fuel in a combustion chamber of an internal combustion engine, the method comprising:
   injecting, in a first injection, gaseous fuel into the internal combustion engine to mix with air in the combustion chamber, the internal combustion engine comprising a pre-combustion chamber having a jet aperture in fluid communication between the pre-combustion chamber and the combustion chamber;
   after the first injection, igniting, in the pre-combustion chamber, mixed gaseous fuel and air ingested into the pre-combustion chamber from the combustion chamber; and
   after the igniting, injecting, in a second injection, gaseous fuel into the pre-combustion chamber and expelling, with the second injection, ignited gaseous fuel and air from the pre-combustion chamber through the jet aperture and into the combustion chamber as a flaming jet with a core of gaseous fuel.

2. The method of claim 1, further comprising injecting, in a third injection after the second injection, gaseous fuel through the pre-combustion chamber into the combustion chamber.

3. The method of claim 2, where the quantity of gaseous fuel injected in the first injection is larger than injected in the third injection, and the quantity of fuel injected in the third injection is larger than injected in the second injection.

4. The method of claim 2, where the internal combustion engine is a reciprocating engine comprising a piston in the combustion chamber, and
   where injecting, in the third injection, gaseous fuel comprises injecting, in the third injection, gaseous fuel after the piston has passed compression top dead center.

5. The method of claim 4, where injecting, in the second injection, gaseous fuel comprises injecting, in the second injection, gaseous fuel before the piston has passed compression top dead center.

6. The method of claim 3, where the first, second and third injection comprise all of the gaseous fuel injected during a cycle of the engine.

7. The method of claim 1, where a majority of the fuel injected in the first and second injection is injected in the first injection.

8. The method of claim 1, where the engine is a reciprocating engine comprising a piston in the combustion chamber, and the first and second injections are injected before compression top dead center.

9. The method of claim 1, where the flaming jet is diffusion combustion.

10. The method of claim 1, where injecting, in a first injection, gaseous fuel into the internal combustion engine comprises injecting, in a first injection, gaseous fuel through the pre-combustion chamber into the internal combustion engine.

11. A system, comprising:
   an engine fuel injector-igniter assembly adapted for installation to an engine in fluid communication with a combustion chamber of the engine, the injector-igniter assembly comprising an enclosure defining a pre-combustion chamber enclosing an outlet of a gaseous fuel injector and an igniter and comprising a jet aperture in fluid communication between the interior of the pre-combustion chamber and the exterior of the pre-combustion chamber;
   a controller adapted to communicatively couple to the injector-igniter assembly, the controller adapted to:
      signal the injector-igniter assembly to inject a first injection of gaseous fuel through the pre-combustion chamber into the combustion chamber via the jet aperture;
      after the first injection, signal the injector-igniter assembly to ignite, in the pre-combustion chamber, mixed gaseous fuel and air ingested into the pre-combustion chamber from the combustion chamber; and
      after the ignition, signal the injector-igniter assembly to inject a second injection of gaseous fuel into the pre-combustion chamber and expel, with the second injection, ignited gaseous fuel and air from the pre-combustion chamber through the jet aperture and into the combustion chamber as a flaming jet with a core of gaseous fuel.

12. The system of claim 11, where the controller is further adapted to signal the injector-igniter assembly to inject a third injection of gaseous fuel into the pre-combustion chamber, the third injection being a smaller quantity of fuel than the first injection and a greater quantity of fuel than the second injection.

13. The system of claim 12, where the controller is adapted to signal the injector-igniter assembly to inject the first injection and second injection of gaseous fuel before compression top dead center and the third injection of gaseous fuel after top dead center.

14. The system of claim 12, where the controller is adapted to inject all the fuel injected into the engine during a cycle in the first, second and third injections.

15. The system of claim 11, where the injector-igniter assembly is generally elongate and the enclosure comprises a plurality of jet apertures, and where at least one of the jet apertures is oriented laterally and one of the jet apertures is oriented axially.

16. The system of claim 11, where the enclosure defines an axial interior passage extending from a jet aperture to the remainder of the pre-combustion chamber, where the greatest transverse dimension of the passage is smaller than the greatest transverse dimension of the remainder of the pre-combustion chamber.

17. A method, comprising:
   injecting gaseous fuel into an engine to mix with air in a main combustion chamber of the engine;

after the injecting, igniting, in a pre-combustion chamber, mixed gaseous fuel and air ingested into the pre-combustion chamber from the main combustion chamber; and after the igniting, injecting gaseous fuel into the pre-combustion chamber forming a flaming jet with a core of gaseous fuel in the main combustion chamber.

18. The method of claim 16, comprising injecting gaseous fuel into the pre-combustion chamber to compete the total fuel charge supplied to the combustion chamber in a cycle of the engine.

19. The method of claim 18, where injecting gaseous fuel into the pre-combustion chamber forming a flaming jet with a core of gaseous fuel in the main combustion chamber comprises injecting less gaseous fuel than in the first mentioned injecting.

\* \* \* \* \*

UNITED STATES PATENT AND TRADEMARK OFFICE
CERTIFICATE OF CORRECTION

PATENT NO. : 9,890,689 B2
APPLICATION NO. : 14/927327
DATED : February 13, 2018
INVENTOR(S) : Gregory James Hampson and Domenico Chiera It is certified that error appears in the above-identified patent and that said Letters Patent is hereby corrected as shown below:

In the Specification

Column 3, Line 11, delete "precombustion" and insert -- pre-combustion --;

In the Claims

Column 9, Line 8, Claim 18, delete "claim 16," and insert -- claim 17, --.

Signed and Sealed this
Nineteenth Day of May, 2020

Andrei Iancu
*Director of the United States Patent and Trademark Office*